(12) United States Patent
Bucsan et al.

(10) Patent No.: US 12,271,213 B2
(45) Date of Patent: Apr. 8, 2025

(54) SYSTEMS AND METHODS FOR CONTROLLING FLUID FLOW

(71) Applicant: Electra Aero, Inc., Manassas, VA (US)

(72) Inventors: George Bucsan, McLean, VA (US); Tim Moser, Trimbach (CH)

(73) Assignee: Electra Aero, Inc., Manassas, VA (US)

( * ) Notice: Subject to any disclaimer, the term of this patent is extended or adjusted under 35 U.S.C. 154(b) by 0 days.

(21) Appl. No.: 18/310,265

(22) Filed: May 1, 2023

(65) Prior Publication Data
US 2023/0359230 A1 Nov. 9, 2023

Related U.S. Application Data

(60) Provisional application No. 63/337,949, filed on May 3, 2022.

(51) Int. Cl.
| | | |
|---|---|---|
| G05D 23/19 | (2006.01) | |
| F16K 11/072 | (2006.01) | |
| G05B 19/4155 | (2006.01) | |

(52) U.S. Cl.
CPC ............ *G05D 23/19* (2013.01); *F16K 11/072* (2013.01); *G05B 19/4155* (2013.01); *G05B 2219/34013* (2013.01)

(58) Field of Classification Search
CPC ... G05D 23/19; F16K 11/072; G05B 19/4155; G05B 2219/34013; Y10T 137/86839; Y10T 137/86654
See application file for complete search history.

(56) References Cited

U.S. PATENT DOCUMENTS

| | | | | | |
|---|---|---|---|---|---|
| 1,274,345 | A | * | 7/1918 | Sterling ................ | B62D 5/083 91/437 |
| 2,229,931 | A | * | 1/1941 | Parker .................... | F16K 39/06 137/625.22 |
| 3,805,838 | A | * | 4/1974 | Christensen ........ | F16K 11/0708 251/209 |
| 3,847,546 | A | * | 11/1974 | Paul ....................... | G01N 30/12 73/23.35 |
| 4,201,963 | A | * | 5/1980 | Welti ..................... | H01P 1/122 333/108 |
| 4,480,662 | A | * | 11/1984 | Garrels ................... | F16K 5/10 137/625.3 |
| 4,649,355 | A | * | 3/1987 | Ullman ................. | H01P 1/125 333/248 |

(Continued)

*Primary Examiner* — Craig M Schneider
*Assistant Examiner* — Christopher D Ballman
(74) *Attorney, Agent, or Firm* — DUANE MORRIS LLP

(57) ABSTRACT

In some embodiments, a valve may include a core defining a first channel, a second channel, and a third channel. The core may be configured to rotate to at least a first position, a second position, and a third position. When the core is in the first position fluid flow may be facilitated in a first direction through the first channel and the third channel. When the core is in the second position fluid flow may be facilitated in a second direction through the third channel and the first channel. When the core is in the third position fluid flow may be facilitated in a third direction through the second channel. The valve may also include a housing having a first input port, a first output port, a second input port, and a second output port positioned on the housing. The core may be disposed within the housing.

20 Claims, 16 Drawing Sheets

(56) References Cited

U.S. PATENT DOCUMENTS

| | | | | |
|---|---|---|---|---|
| 4,761,622 | A * | 8/1988 | Cracknell | H01P 1/122 333/108 |
| 4,806,887 | A * | 2/1989 | Au-Yeung | H01P 1/122 333/34 |
| 4,945,320 | A * | 7/1990 | Hettlage | H01P 1/122 333/108 |
| 4,967,170 | A * | 10/1990 | Hettlage | H01P 1/122 333/108 |
| 5,053,732 | A * | 10/1991 | Elgass | H01P 1/122 333/108 |
| 5,342,028 | A * | 8/1994 | Nevrekar | F16K 5/204 251/163 |
| 5,744,762 | A * | 4/1998 | Seki | F01N 1/166 181/254 |
| 6,448,869 | B1 * | 9/2002 | Kich | H01P 1/122 333/108 |
| 7,193,488 | B2 * | 3/2007 | Mayer | H01Q 1/12 333/108 |
| 7,330,087 | B2 * | 2/2008 | Gorovoy | H01P 1/122 333/108 |
| 7,740,026 | B2 * | 6/2010 | Matsui | F16K 3/085 110/244 |
| 9,368,851 | B2 * | 6/2016 | Shayegani | H01P 1/122 |
| 11,015,725 | B2 * | 5/2021 | Lee | F16K 31/04 |
| 11,168,797 | B2 * | 11/2021 | Dragojlov | F16K 31/535 |
| 2006/0118066 | A1 * | 6/2006 | Martins | F16K 11/0856 123/41.08 |

\* cited by examiner

SYSTEMS AND METHODS FOR CONTROLLING FLUID FLOW

CROSS-REFERENCE TO RELATED APPLICATIONS

This application claims the benefit of priority under 35 U.S.C. § 119(e) to prior U.S. Provisional Application No. 63/337,949 filed on May 3, 2022, the disclosure of which is incorporated by reference herein in its entirety.

FIELD OF DISCLOSURE

The present disclosure generally relates to the field of fluid flow control. More specifically, the present disclosure relates to a flow bypass and reverse valve in a cooling system.

BACKGROUND OF THE INVENTION

Temperature control systems are typically used to control the temperature across the loads of the system. For example, in electrical systems, such as battery packs or fuel cell stacks, a form of cooling is required to ensure the components of the electrical system stay below a predetermined temperature. Temperature control systems (heating and cooling) may be used to uniformly maintain and manage the system load temperatures.

In a first conventional example, FIG. 1A is a view of the cooling topology of a single pass flow path system 10. The fluid 12 within the system 10 starts at first point 13, passes through the inlet 14 of the loads 16a-f, through loads 16a-f, and through the outlet 18 of the last load 16f at second point 19. In a single pass flow path system 10 the fluid 12 enters and exits the load only once and moves on to the next load (as applicable). This single pass flow path system 10 provides cooling to the system 10, but the temperature gradient through the loads 16a-f can be high as the fluid 12 in the system 10 warms up passing through the loads 16a-f. For example, if fluid 12 enters the inlet 14 of the first load 16a from the outlet of a chiller, the fluid 12 is relatively cold as it passes through the first load 16a. The fluid 12 will gradually warm up as it passes through loads 16b-f and will be a warm fluid 12 as it exits the outlet 18 of the last load 16f. A single pass flow path system 10 is conventionally used because of its simplicity and low cost of implementation.

In a second conventional example, FIG. 1B is a view of the cooling topology of a multi-pass flow path system 20. A multi-pass flow path system 20 attempts to correct the high temperature gradient that exists in the single pass flow path system 10 by winding the flow path to go through the system 20 at least one additional time. The fluid 22 within the system 20 starts at first point 23 and flows into the inlet 24 of the first load 26a, flows through the loads 26a-f in one direction and then flows back through the loads 26f-a in a second direction to an outlet 28 of the first load 26a to second point 29. Regarding the temperature gradient in system 20, if fluid 22 enters the inlet 24 of the first load 26a from the outlet of a chiller, the fluid 22 is relatively cold as it passes through the inlet of the first load 26a. The fluid 22 will gradually warm up as it passes through loads 26b-f and winds back through loads 26f-a. The fluid 22 will be a warm fluid 22 as it exits the outlet 28 of the first load 26a. Although, this multi-pass flow path system 20 does correct the temperature gradient within the system, a temperature gradient can still exist at the top and bottom of the loads 26a-f.

In a third example, FIG. 1C is a view of the cooling topology of a reverse multi-pass flow path 30 system. The fluid 32 within the system 30 starts at first point 33 and enters the inlet 34 of the first load 36a, through the loads 36a-f, winds back through loads 36f-a, and out the outlet 38 of the first load 36a to second point 39. The fluid 32 can then be reversed allowing the fluid 32 to flow from second point 39 through the outlet 38 of the first load 36a, through the loads 36a-f, winding back through loads 36f-a, and out the inlet 34 of the first load 36a to first point 33. Regarding the temperature gradient within system 30, if fluid 32 enters the inlet 34 of the first load 36a from the outlet of a chiller, the fluid 32 is relatively cold as it passes through the inlet of the first load 36a. The fluid 32 will gradually warm up as it passes through loads 36b-f and winds back through loads 36f-a. The fluid 32 will be a warm fluid 32 as it exits the outlet 38 of the first load 36a. In order to further reduce the temperature gradient at the top and bottom of loads 36a-f, the flow path is reversed back through the system 30. Conventionally, reverse flow is controlled with two conventional valves actuated independently or with a flow reverse valve. However, these conventional methods of controlling flow in a temperature control system do not allow the system to bypass a load if heating or cooling is not desired. This ability to bypass a load is especially desirable in long systems, such as system having many high voltage battery or fuel cells connected in series.

The present disclosure addresses the aforementioned challenges and problems by providing a single flow control device capable of normal (default), reverse, and bypass flow through a system. Embodiments of the present disclosure describe a flow bypass and reverse valve (or bypass reverse valve), that advantageously allows for the bypass and reverse flow of fluid in a temperature control system. In various embodiments, this single flow control device helps reduce the complexity of the overall system design by reducing the size and number of elements in the system and allows for more uniformity of the temperature gradient across all of the loads in the system.

SUMMARY OF THE DISCLOSURE

In some embodiments, a valve may include a core defining a first channel, a second channel, and a third channel disposed within the core. The core may be configured to rotate to at least a first position, a second position, and a third position. When the core is in the first position fluid flow may be facilitated in a first direction through the first channel and the third channel. When the core is in the second position fluid flow may be facilitated in a second direction through the third channel and the first channel. When the core is in the third position fluid flow may be facilitated in a third direction through the second channel. The valve may also include a housing having a top section and a bottom section of the housing. The housing may have a first input port, a first output port, a second input port, and a second output port positioned on the housing. The core may be disposed within the housing.

In some embodiments, a thermal management system includes a valve having a core defining a first channel, a second channel, and a third channel disposed within the core. The core may be configured to rotate to at least a first position, a second position, and a third position. When the core is in the first position fluid flow may be facilitated in a first direction through the first channel and the third channel. When the core is in a second position fluid flow may be facilitated in a second direction through the third channel and the first channel. When the core is in a third position fluid flow may be facilitated in a third direction through the second channel. The valve may also include a housing having a top section and a bottom section of the housing. The housing may have a first input port, a first output port, a second input port, and a second output port positioned on the housing. The core may be disposed within the housing. The thermal management system may also include at least one load coupled to the thermal management system that is cooled by the fluid. The thermal management system may also include a chiller configured to cool the fluid. The thermal management system may also include a computing device communicatively coupled to an actuator coupled to the core. The computing device may be configured to send an actuation input to the actuator to rotate the core to one of the first position, the second position, and the third position of the core.

In some embodiments, a method of managing fluid flow through a thermal management system includes receiving temperature data from at least one temperature sensor within the thermal management system. The method may also include determining a first flow path through a core of a valve based at least in part on the temperature data within the thermal management system and a preset threshold value. The first flow path through the core may correspond to one of a default position, a reverse position, and a bypass position of the core. The method may also include transmitting an actuation input to an actuator operatively coupled to the core. In response to the actuation input the actuator may rotate the core of the valve from the first flow path to a second flow path through the core facilitating a change in direction of fluid flow through the thermal management system.

BRIEF DESCRIPTION OF THE DRAWINGS

The features and advantages of the present disclosure will be more fully disclosed in, or rendered obvious by, the following detailed descriptions of example embodiments. The detailed descriptions of the example embodiments are to be considered together with the accompanying drawings wherein like numbers refer to like parts and further wherein.

Figure 1A:
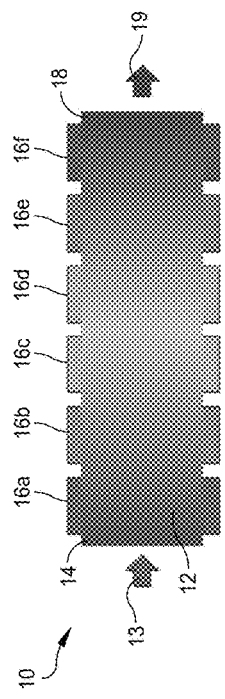
FIG. 1A illustrates a view of the cooling topology of a single pass flow path system.
Figure 1B:
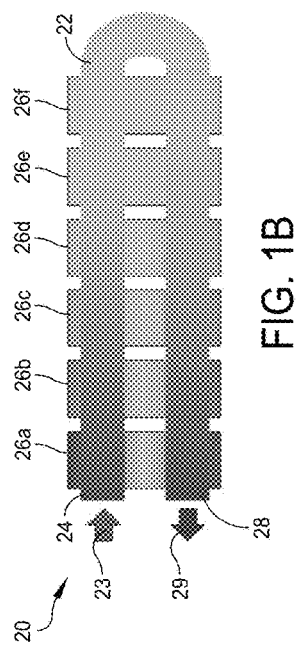
FIG. 1B illustrates a view of the cooling topology of a multi-pass flow path system.
Figure 1C:
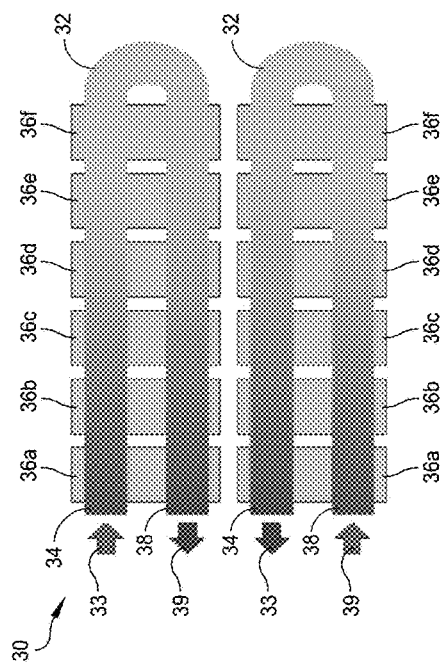
FIG. 1C illustrates a view of the cooling topology of a reverse multi-pass flow path system in accordance with some embodiments.
Figure 2:
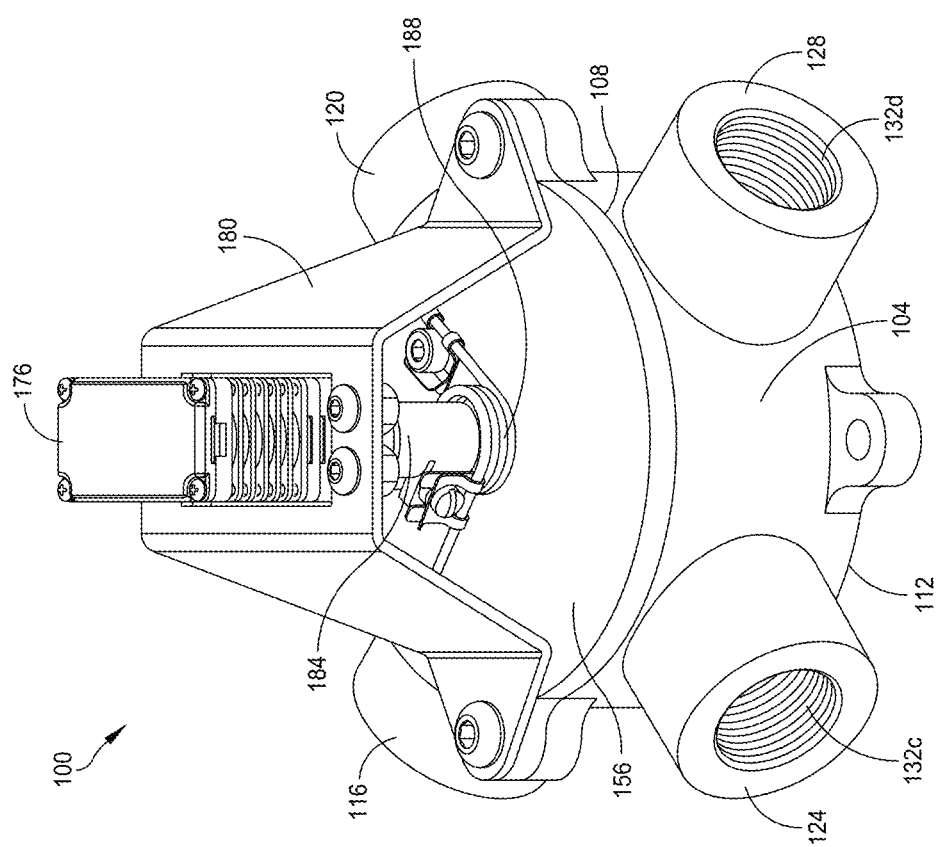
FIG. 2 illustrates an isometric view of a bypass reverse valve in accordance with some embodiments.
Figure 3:
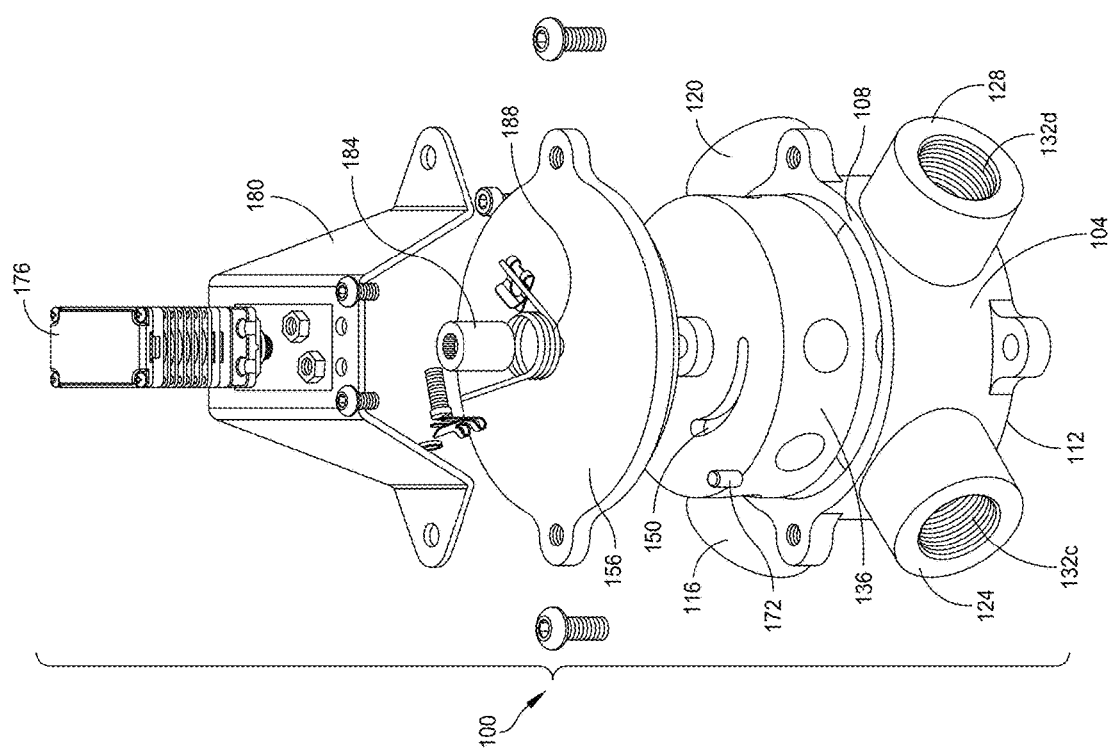
FIG. 3 illustrates an exploded view of a bypass reverse valve in accordance with some embodiments.
Figure 4:
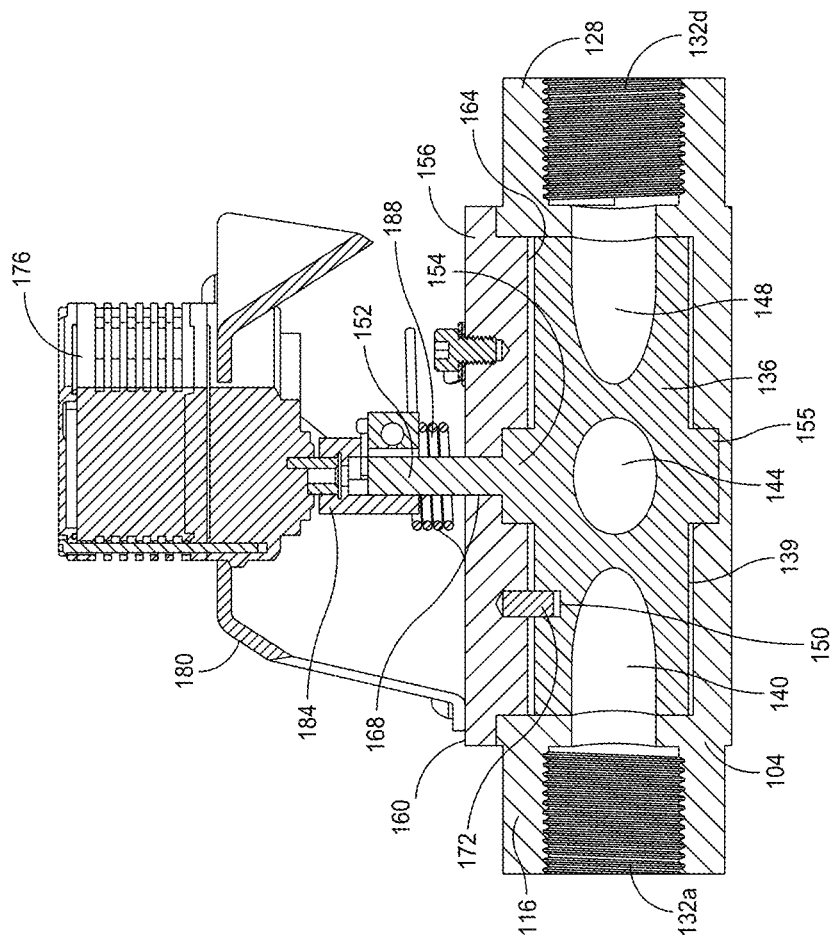
FIG. 4 illustrates a cross-sectional view of a bypass reverse valve accordance with some embodiments.
Figure 5A:
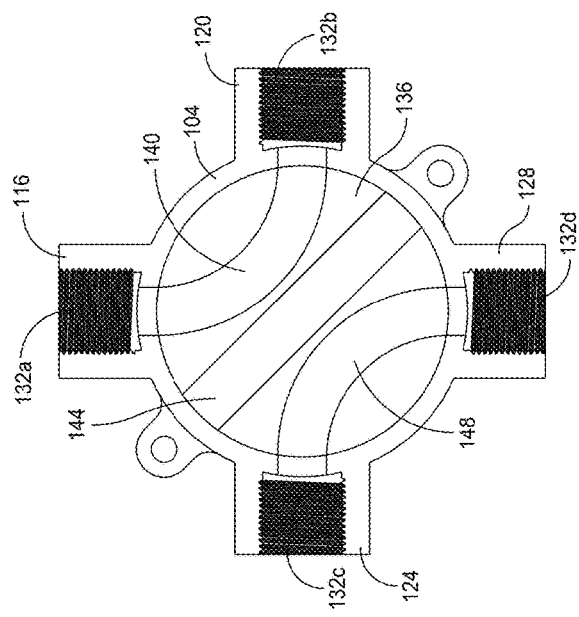
FIG. 5A illustrates a top down view of a bypass reverse valve in accordance with some embodiments.
Figure 5B:
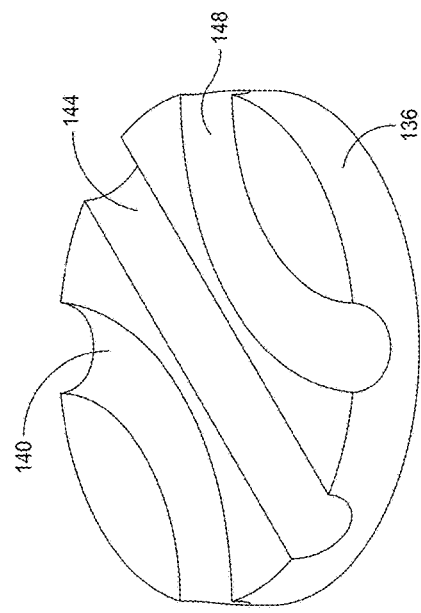
FIG. 5B illustrates a cross-sectional view of a bypass reverse valve core in accordance with some embodiments.
Figure 6A:
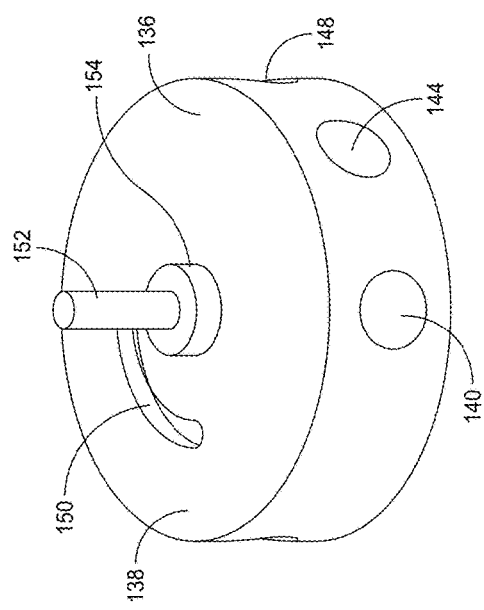
FIG. 6A illustrates an isometric view of a bypass reverse valve core in accordance with some embodiments.
Figure 6B:
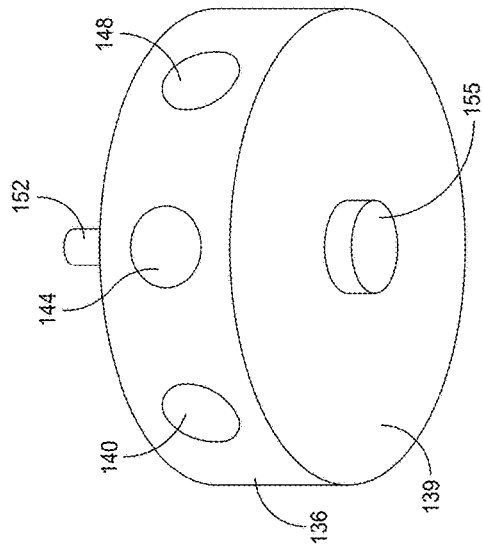
FIG. 6B illustrates another isometric view of a bypass reverse valve core in accordance with some embodiments.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

The present disclosure is directed to a single control device used to control the normal (default), reverse, and bypass flow of fluid through a system. According to embodiments of the present disclosure, the bypass reverse valve is configured for use in a cooling system of an electric vehicle operated by batteries. For example, the bypass reverse valve may be configured for use in an aircraft with a distributed electric propulsion (DEP) system having electric propulsion units (EPUs) for producing thrust. As will be appreciated by one of ordinary skill in the art, the bypass reverse valve may be used in any fluid system that desires the ability to bypass and reverse the fluid flow in a system, such as other battery or fuel cell systems, systems that use a series of heat exchangers, or systems having a series of liquid cooled machines.

Referring now to FIGS. 2-6B, a bypass reverse valve 100 capable default flow (first position), reverse (second position), and bypass (third position) flow through a system includes a housing 104 having a top section 108 and a bottom section 112. The housing 104 also includes four ports positioned on the housing 104. The four ports correspond to a first input port 116, a first output port 120, a second input port 124, and a second output port 128. In some embodiments, the four ports are disposed radially at 90 degrees from each other. The four ports 116, 120, 124, and 128 may have a threaded portion 132*a-d* disposed within the four ports (i.e., first input port 116, first output port 120, second input port 124, and second output port 128) that is configured to couple to a cooling system. The housing 104 may be made of any suitable material, such as metal, metal alloy, plastic, etc. In some embodiments, the housing 104 may be generally circular, but other shapes are possible.

The bypass reverse valve 100 also includes a core 136 having a top portion 138 and a bottom portion 139 disposed within the housing 104. The core 136 defines a first channel 140, a second channel 144, and a third channel 148 configured to facilitate fluid flow through the bypass reverse valve 100. The first channel 140 and the third channel 148 may have gentle turning radii to minimize the pressure drop on the system. The core 136 is configured to move (e.g., rotate, translate, etc.) within the housing 104 to facilitate fluid flow in three different directions depending on the position of the core 136. The core 136 may have a groove 150 disposed on the top portion 138 of the core 136 that is configured to limit the movement of the core 136 when rotated. The core 136 also includes a shaft 152 disposed on the top portion 138 that is used to move the core 136 within the housing 104. The core 136 may be made of any suitable material, such as metal, metal alloy, plastic, etc. For example, the core 136 could be constructed of self-lubricating plastic, such as polypropylene or glass-filled polytetrafluoroethylene (PTFE). In other embodiments, the core 136 is made of any sturdy material and includes a first bearing 154 and a second bearing 155 configured to allow the core 136 to move smoothly within the housing 104. In some embodiments, the core 136 may be generally circular to match a circular shape of the housing 104, but other shapes are possible. In fact, the bypass reverse valve 100 may have a different number of channels and/or ports arranged to provide a variety of flow paths, and that the bypass reverse valve 100 is not limited to the examples described herein.

The bypass reverse valve 100 may also include a cap 156 with a top end 160 and a bottom end 164. The cap 156 defines a hole 168 disposed from the top end 160 to the bottom end 164 that is configured to receive the shaft 152 of the core 136. The cap 156 may be generally circular to match a circular shape of the housing 104 and core 136, but other shapes are possible. In some embodiments, the bottom end 164 of the cap 156 has a pin 172 operatively coupled to the bottom end 164 that is configured to be received and travel within the groove 150 of the core 136 limiting the movement of the core 136 when rotated. The cap 156 is configured to retain the core 136 within the housing 104 and prevent leakage of fluid out of the bypass reverse valve 100. In further embodiments, the bypass reverse valve 100 includes a shaft 152 seal and/or a seal for the cap 156, such as an O-ring, used to help prevent leakage. The wetted components such as the core 136, housing 104, cap 156, etc. are preferably made out of materials that are resistant to chemicals and have negligible fluid absorption capabilities to ensure the reliability of the cooling system. For example, the cap 156 may be made of any suitable material, such as metal, metal alloy, plastic, etc.

The bypass reverse valve 100 may also include an actuator 176 operatively coupled to the cap 156 and/or housing 104. For example, the actuator 176 may be fixed to a frame 180 that is coupled to the cap 156 and/or housing 104. The actuator 176 is operatively coupled to the shaft 152 through a shaft adapter 184 that is configured to rotate the shaft 152 of the core 136, moving the core 136 between a plurality of positions. The actuator 176 may be communicatively coupled to a computing device configured to send an actuation input to the actuator 176 to rotate the core 136. In some embodiments, the actuator 176 is a servo motor used to rotate the shaft 152 of the core 136. However, other ways to actuate rotation of the core of the bypass reverse valve 100 may be employed, such as a rotational or linear solenoid, spur gears, springs, linear linkages or cables may be employed to change the position of the core 136 of the bypass reverse valve 100. In other embodiments, the bypass reverse valve 100 may not have an actuator 176, and the shaft 152 can be moved manually. The aforementioned ways to change the position of the core 136 are merely a few examples for carrying out the process and is not limited by the examples described herein. A person of ordinary skill in the art would appreciate and understand other ways to achieve the same results.

In some embodiments, the bypass reverse valve 100 may include a failure mechanism 188 operatively coupled to the shaft adapter 184. The failure mechanism 188 may comprise a spring (torsional, linear, flat, etc.) or other internal device to revert the core 136 back to a default position upon a failure of the actuator 176. With the core 136 in a default position, the fluid would flow like normal through the cooling system (i.e., from a cooling device, through the loads, and back to the cooling device). In other embodiments, a spring coaxial to the core 136 and shaft 152 may be used instead of a spring operatively coupled to the actuator 176.

In various embodiments, the bypass reverse valve 100 further comprises fasteners such as screws, retaining rings, bolts, etc. It will be appreciated that a person of skill in the art will understand that these components may be fastened together in a variety of different ways in order to achieve the desired functions as described herein.

Figure 7:
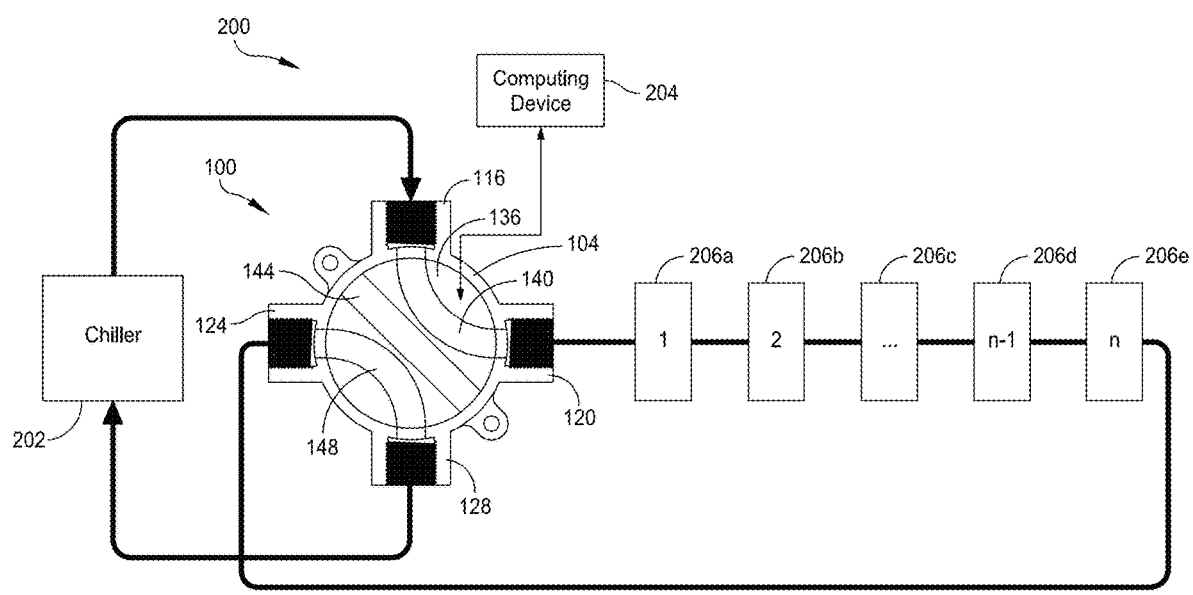
FIG. 7 illustrates a bypass reverse valve in an example cooling system in accordance with some embodiments.
Figure 8A:
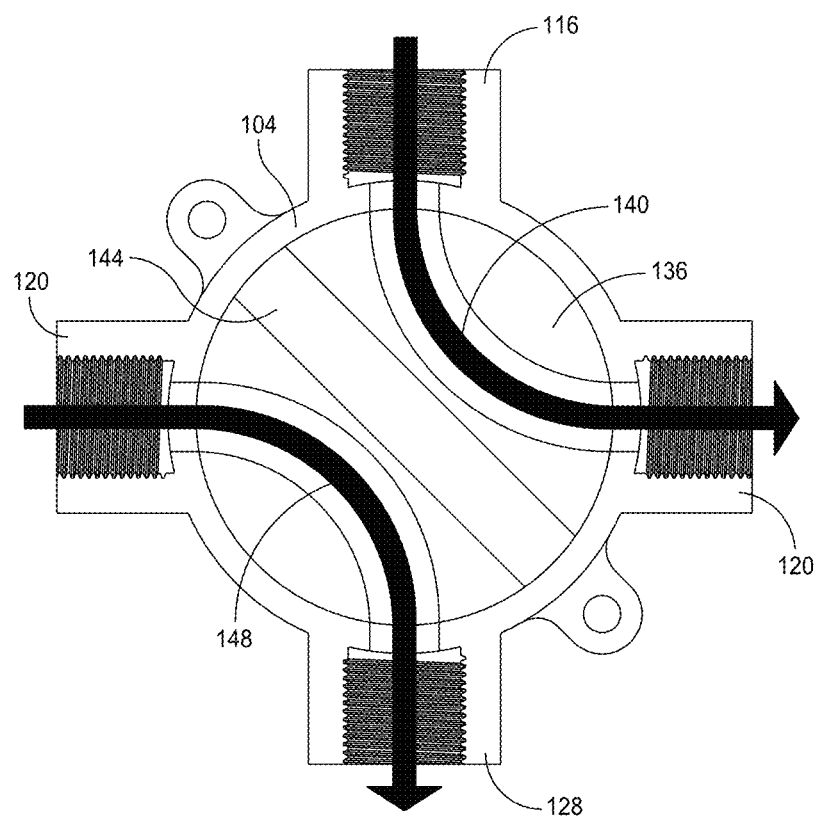
FIG. 8A illustrates a top-down view of a bypass reverse valve aligned for a default flow path in accordance with some embodiments.
Figure 8B:
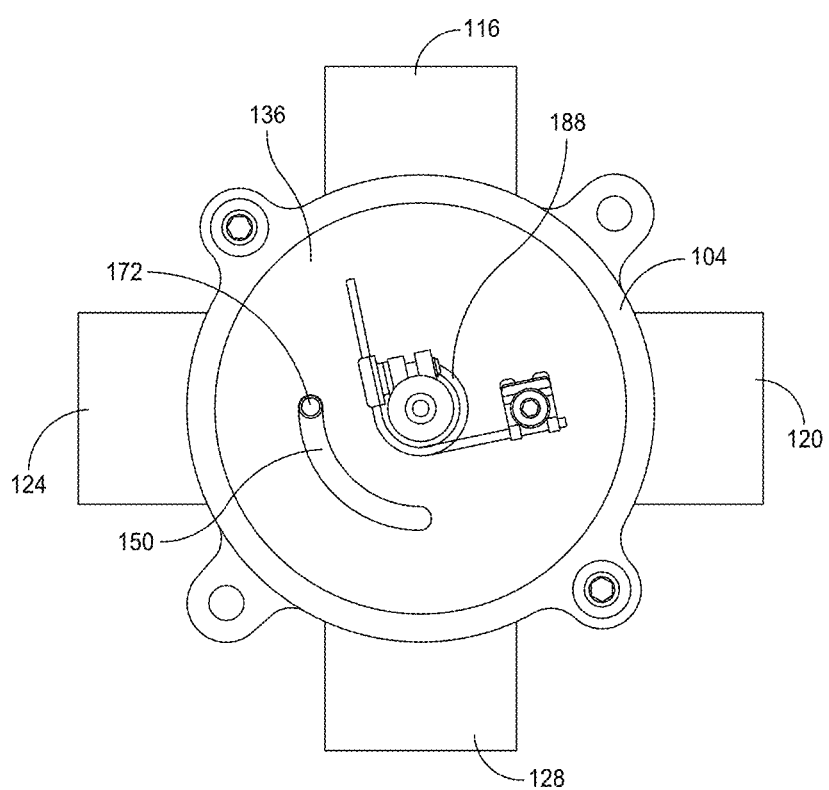
FIG. 8B illustrates a top-down view of a bypass reverse valve with a failure mechanism aligned for a default flow path in accordance with some embodiments.

Referring now to FIGS. 7-10B, the cooling system 200 comprises a chiller 202 configured to cool the fluid within the system 200, bypass reverse valve 100, a computing device 204 communicatively coupled to various points within the cooling system 200 (e.g., the actuator 176 of the bypass reverse valve 100, the temperature sensors within the cooling system 200, etc.), and at least one load 206a-e (e.g., batteries). By changing the position of the core 136 of the bypass reverse valve 100, the flow path through the cooling system 200 is changed. For example, in a default position as illustrated in FIGS. 7-8B, the flow path through the system is in a first direction from the chiller 202 into the first input port 116, through the first channel 140, out the first output port 120, through the loads 206a-e, into the second input port 124, through the third channel 148, out the second output port 128, and back through the chiller 202. In this default position, the pin 172 is at a first limit within groove 150 to ensure the first channel 140 is aligned with the first input port 116 and the first output port 120, and the third channel 148 is aligned with the second input port 124 and the second output port 128. In various embodiments, the radial tolerance between the core 136 and housing 104 is kept small to prevent a significant pressure drop across the bypass reverse valve 100. For example, the range may have a small clearance (approximately 0.1 mm to 0.5 mm or less) to ensure adequate pressure is maintained in the system.

Figure 9A:
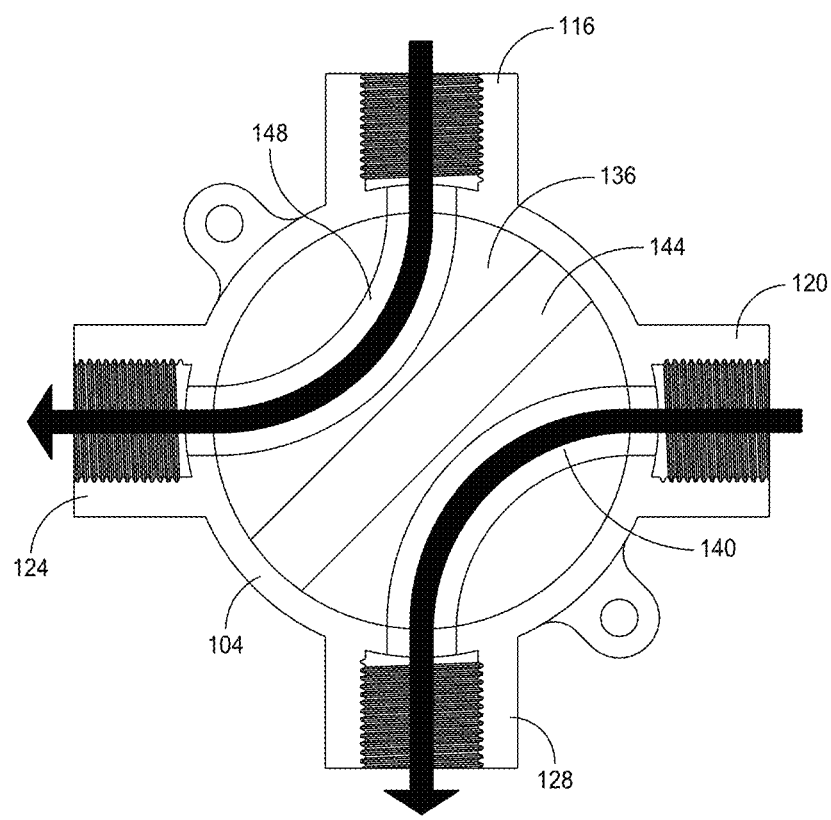
FIG. 9A illustrates a top-down view of a bypass reverse valve aligned for a reverse flow path in accordance with some embodiments.
Figure 9B:
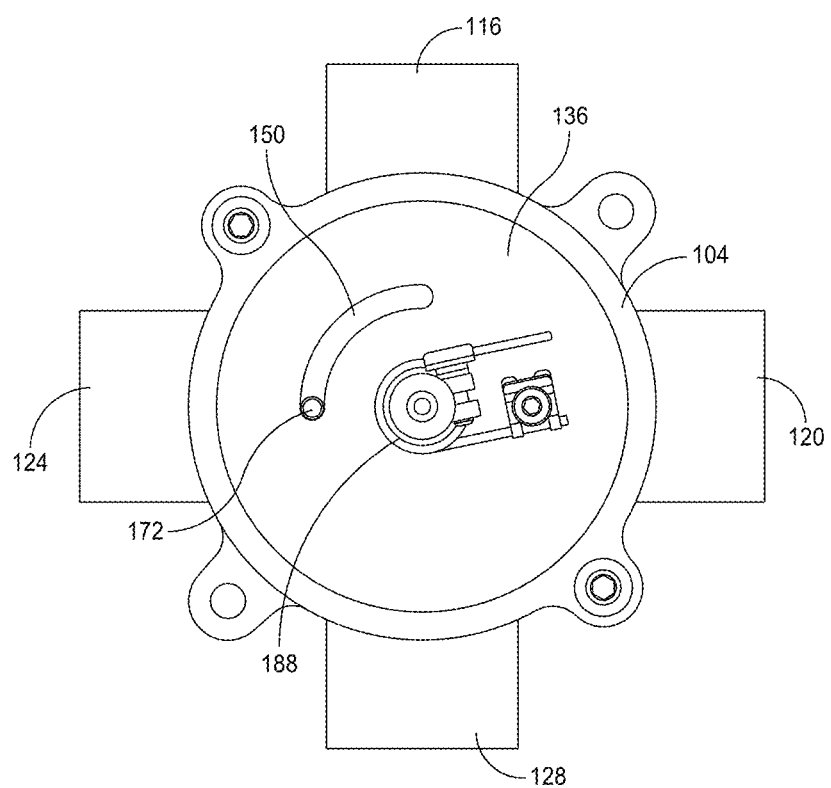
FIG. 9B illustrates a top-down view of a bypass reverse valve with a failure mechanism aligned for a reverse flow path in accordance with some embodiments.

If reverse flow through the system is desired, then the core 136 is rotated to the reverse position as illustrated in FIGS. 9A-9B. The decision to reverse the fluid flow of the system 200 may be dependent on the temperatures of the first load 206a and last load 206e in a system, the temperature of the inbound fluid from the system through the first input port 116, and a preset threshold temperature. The flow path in the second direction for the reverse position is from the chiller 202 to the first input port 116, through the third channel 148, out the second input port 124, through the loads 206e-a, into the first output port 120, through first channel 140, out the second output port 128, and back through the chiller 202. In this reverse position, the pin 172 is at a second limit within the groove 150 to ensure the third channel 148 is aligned with the first input port 116 and the second input port 124, and the first channel 140 is aligned with the first output port 120 and the second output port 128.

Figure 10A:
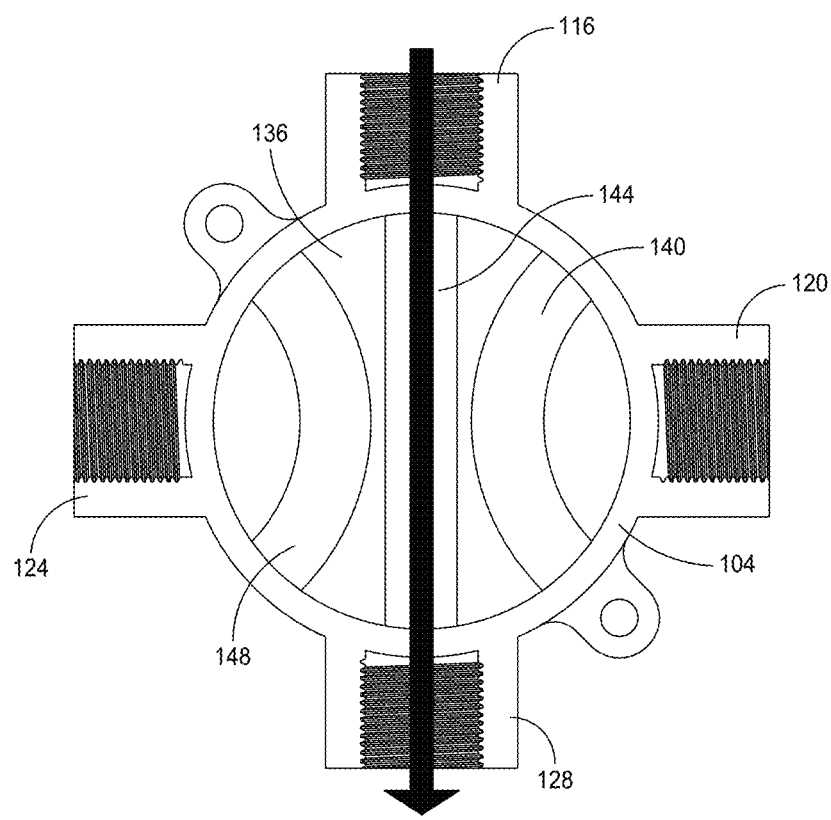
FIG. 10A illustrates a top-down view of a bypass reverse valve aligned for a bypass flow path in accordance with some embodiments.
Figure 10B:
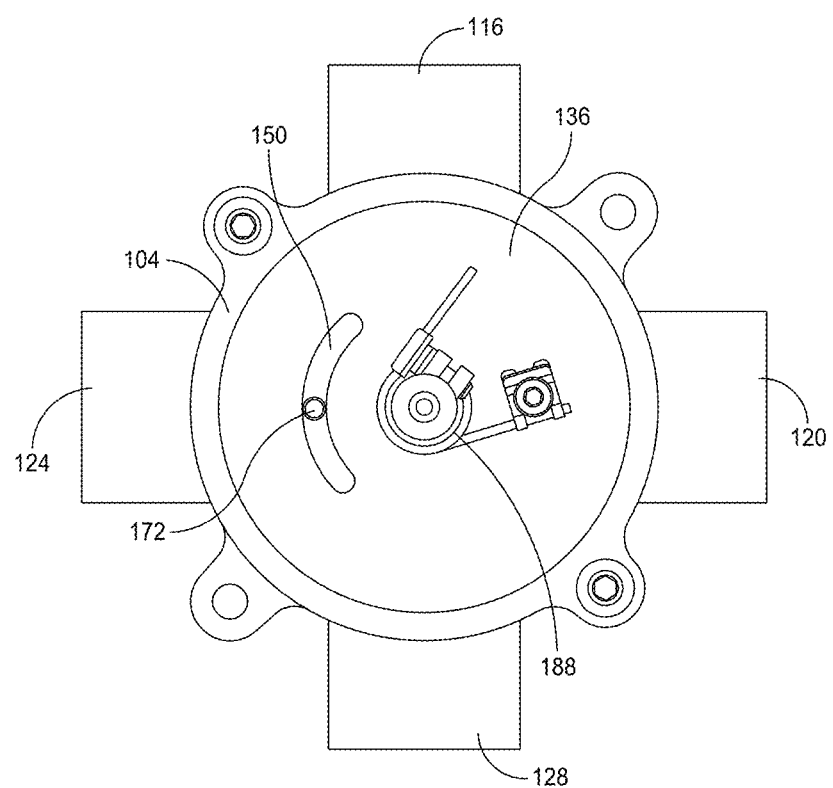
FIG. 10B illustrates a top-down view of a bypass reverse valve with a failure mechanism aligned for a bypass flow path in accordance with some embodiments.

If bypass flow through the system is necessary, then the core 136 is rotated to the bypass position facilitating fluid flow in a third direction as illustrated in FIGS. 10A-10B. For example, if the inbound fluid temperature at the first output port 120 is higher than the sum of the maximum temperature of the loads 206*a-e* and a preset threshold value then the bypass reverse valve 100 position may be taken to the bypass position for the fluid to bypass the load 206*a-e* until the temperature of the loads 206*a-e* goes up or the inbound temperature of the cooling fluid goes down. The flow path for the bypass position is from the chiller 202 to the first input port 116, through the second channel 144, out the second output port 128, and back to the chiller 202. In this bypass position, the fluid bypasses the loads 206*a-e* altogether. When the core 136 is in the bypass position, the pin 172 is between the first limit and the second limit within the groove 150 so that the second channel 144 is aligned with the first input port 116 and the second output port 128. This bypass ability is especially beneficial in systems with a plurality of components that may need differential cooling to achieve uniform thermal conditioning, such a batteries or battery packs connected in series.

Figure 11:
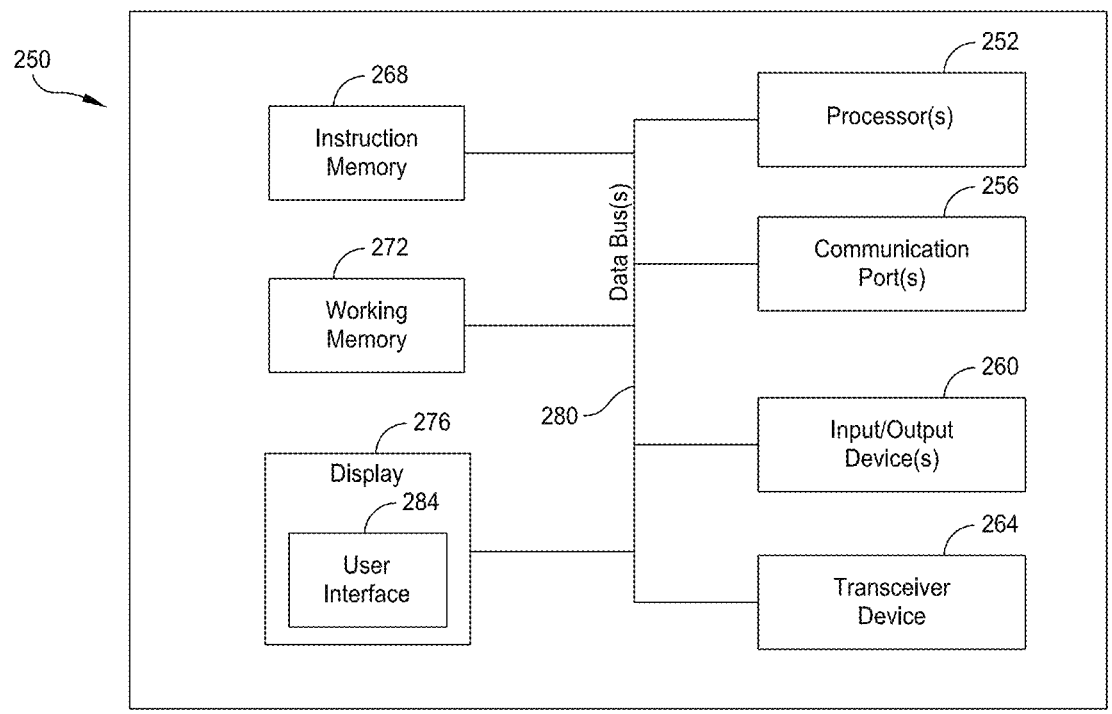
FIG. 11 illustrates an exemplary computing device for controlling the temperature in a system in accordance with some embodiments

FIG. 11 is a block diagram of an example computing device 250 in accordance with some embodiments. The computing device 250 can be employed by a disclosed system or used to execute a disclosed method of the present disclosure. Computing device 250, such as the as computing device 204 illustrated in FIG. 7, can implement, for example, one or more of the functions described herein. It should be understood, however, that other computing device configurations are possible.

Computing device 250 can include one or more processors 252, one or more communication port(s) 256, one or more input/output devices 260, a transceiver device 264, instruction memory 268, working memory 272, and optionally a display 276, all operatively coupled to one or more data buses 280. Data buses 280 allow for communication among the various devices, processor(s) 252, instruction memory 268, working memory 272, communication port(s) 256, and/or display 276. Data buses 280 can include wired, or wireless, communication channels. Data buses 280 are connected to one or more devices. In some embodiments, the data bus 280 may be a Controller Area Network (CAN) bus, Aeronautical Radio INC. (ARINC) 429 bus, or any one of the Institute of Electrical and Electronics Engineers (IEEE) buses available.

Processor(s) 252 can include one or more distinct processors, each having one or more cores. Each of the distinct processors 252 can have the same or different structures. Processor(s) 252 can include one or more central processing units (CPUs), one or more graphics processing units (GPUs), application specific integrated circuits (ASICs), digital signal processors (DSPs), and the like.

Processor(s) 252 can be configured to perform a certain function or operation by executing code, stored on instruction memory 268, embodying the function or operation of a thermal management computer. For example, processor(s) 252 can be configured to perform one or more of any function, method, or operation disclosed herein.

Communication port(s) 256 can include, for example, a serial port such as a universal asynchronous receiver/transmitter (UART) connection, a Universal Serial Bus (USB) connection, or any other suitable communication port or connection. In some examples, communication port(s) 256 allows for the programming of executable instructions in instruction memory 268. In some examples, communication port(s) 256 allow for the transfer, such as uploading or downloading, of data.

Input/output devices 260 can include any suitable device that allows for data input or output. For example, input/output devices 260 can include one or more of a keyboard, a touchpad, a mouse, a stylus, a touchscreen, a physical button, a speaker, a microphone, or any other suitable input or output device.

Transceiver device 264 can allow for communication with a network, such as a Wi-Fi network, an Ethernet network, a cellular network, or any other suitable communication network. For example, if operating in a cellular network, transceiver device 264 is configured to allow communications with the cellular network. Processor(s) 252 is operable to receive data from, or send data to, a network via transceiver device 264.

Instruction memory 268 can include an instruction memory 268 that can store instructions that can be accessed (e.g., read) and executed by processor(s) 252. For example, the instruction memory 268 can be a non-transitory, computer-readable storage medium such as a read-only memory (ROM), an electrically erasable programmable read-only memory (EEPROM), flash memory, a removable disk, CD-ROM, any non-volatile memory, or any other suitable memory with instructions stored thereon. For example, the instruction memory 268 can store instructions that, when executed by one or more processors 252, cause one or more processors 252 to perform one or more of the operations of controlling temperatures within a system, such as the cooling system 200 illustrated in FIG. 7.

In addition to instruction memory 268, the computing device 250 can also include a working memory 272. Processor(s) 252 can store data to, and read data from, the working memory 272. For example, processor(s) 252 can store a working set of instructions to the working memory 272, such as instructions loaded from the instruction memory 268. Processor(s) 252 can also use the working memory 272 to store dynamic data created during the operation of computing device 250. The working memory 272 can be a random access memory (RAM) such as a static random access memory (SRAM) or dynamic random access memory (DRAM), or any other suitable memory.

Display 276 is configured to display user interface 284. User interface 284 can enable user interaction with computing device 250. In some examples, a user can interact with user interface 284 by engaging input/output devices 260. In some examples, display 276 can be a touchscreen, where user interface 284 is displayed on the touchscreen.

Figure 12:
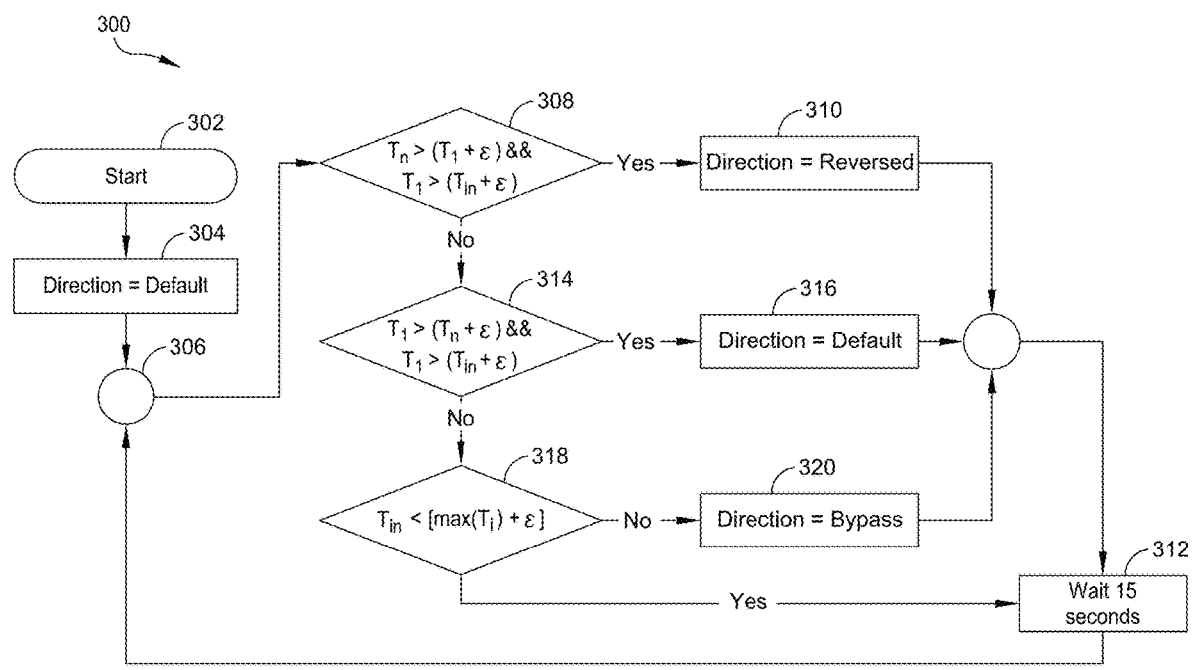
FIG. 12 illustrates a flowchart for temperature control through an example cooling system in accordance with some embodiments.

FIG. 12 illustrates a flowchart for temperature control through an example cooling system, such as system 200 described above, in accordance with some embodiments. The bypass reverse valve 100 may start at step 302 in the default position 304 and the computing device 250 may start the process at step 306 to determine if reverse, default, or bypass flow is desired using calculations comprising a plurality of temperatures in the system and a preset threshold value. For example, one or more temperature sensors can be included within the system itself to measure the temperature at a plurality of different points within the system or may be reading the temperatures in the system from outside of the system. Such temperature sensors may sense temperatures at each load 206*a-e*, the output of the chiller 202, and the input of the chiller 202. At a minimum, there are temperature sensors on the first load 206a, the last load 206e, and the output of the chiller 202 in order to compare temperatures within system 200.

At step 308, if the temperature of the last load 206e ($T_n$) is greater than the sum of a preset threshold value ($\varepsilon$) and the temperature of the first load 206a ($T_1$) AND (&&) the temperature of the first load 206a ($T_1$) is greater the sum of the temperature of the inbound fluid ($T_{in}$) at the first output port 120 and a preset threshold value ($\varepsilon$) then reverse flow is determined to be necessary and the computing device 250 may operate the actuator 176 at step 310 to move the core 136 to the reverse position. After a predetermined cycle 312, which may be 15 seconds, the computing device 250 will start the determination process over at step 306. In some embodiments, flow reversal may be done periodically to maintain a uniform temperature gradient across the loads 206a-e and/or maintain the change in temperature between the load 206a-e with the highest temperature and the load 206a-e with the lowest temperature below a predetermined threshold. In some embodiments, the predetermined threshold temperature difference (in degrees Celsius) may be less than 1 degree, 1 degree, 2 degree, 5 degree or more. The periodic flow reversal as discussed above needs to occur frequent enough to keep the temperature difference between highest temperature load 206a-e and the lowest temperature load 206a-e below the predetermined threshold. In some embodiments, the periodic flow reversal interval may be between 30-60 seconds. In some embodiments, the periodic flow reversal occurs at a frequency less than or equal to 0.25 Hz.

If it is determined that reverse flow is not necessary in step 308, the computing device 250 may determine if the bypass reverse valve 100 should stay in the default position at step 314. The bypass reverse valve 100 should stay in the default position of the if the temperature of the first load 206a ($T_1$) is greater the sum of the temperature of the last load 206e ($T_n$) and a preset threshold value ($\varepsilon$) AND (&&) the temperature of the first load 206a ($T_1$) is greater than the sum of the temperature of the inbound fluid ($T_{in}$) at the first output port 120 and a preset threshold value ($\varepsilon$). If at step 314 the computing device 250 determines the bypass reverse valve 100 should be in the default position, then the computing device 250 may operate the actuator 176 at step 316 to move the core 136 to the default position (if applicable). After a predetermined cycle 312, which may be 15 seconds or other configurable period of time, the computing device 250 will start the determination process over at step 306. If at step 314 the computing device 250 determines that the bypass reverse valve 100 should not stay in the default position, the computing device 250 may then determine if bypass flow is desired.

At step 318, the computing device 250 determines if bypass flow through the system is desired. For example, if the temperature of the inbound fluid ($T_{in}$) from the chiller 202 is greater than or equal to the maximum temperature ($T_i$) of the hottest load 206a-e in the system and a preset threshold value ($\varepsilon$) then the computing device 250 will send an actuation input to the actuator 176 at step 320 to rotate the core 136 to the bypass position (if applicable). Otherwise, the bypass reverse valve 100 will maintain the current position and wait until the current predetermined cycle is over at step 312 before starting the determination process over at step 306. In some embodiments, the aforementioned preset threshold value ($\varepsilon$) may be a single value for each flowchart step/bypass reverse valve 100 position determination. For example, the preset threshold value ($\varepsilon$) may equal 5 degrees Celsius. In other embodiments, the preset threshold value ($\varepsilon$) may change depending on which flowchart step/bypass reverse valve 100 position is being determined. As an example, if the goal is to cool the loads 206a-e then the preset threshold value ($\varepsilon$) may be small, such as 0.5 Celsius or more, to adequately cool the loads 206a-e. However, if the goal is to warm up the loads 206a-e then the preset threshold value ($\varepsilon$) may be much higher, such as 2-10 degrees Celsius, to adequately warm the loads 206a-e.

Figure 13:
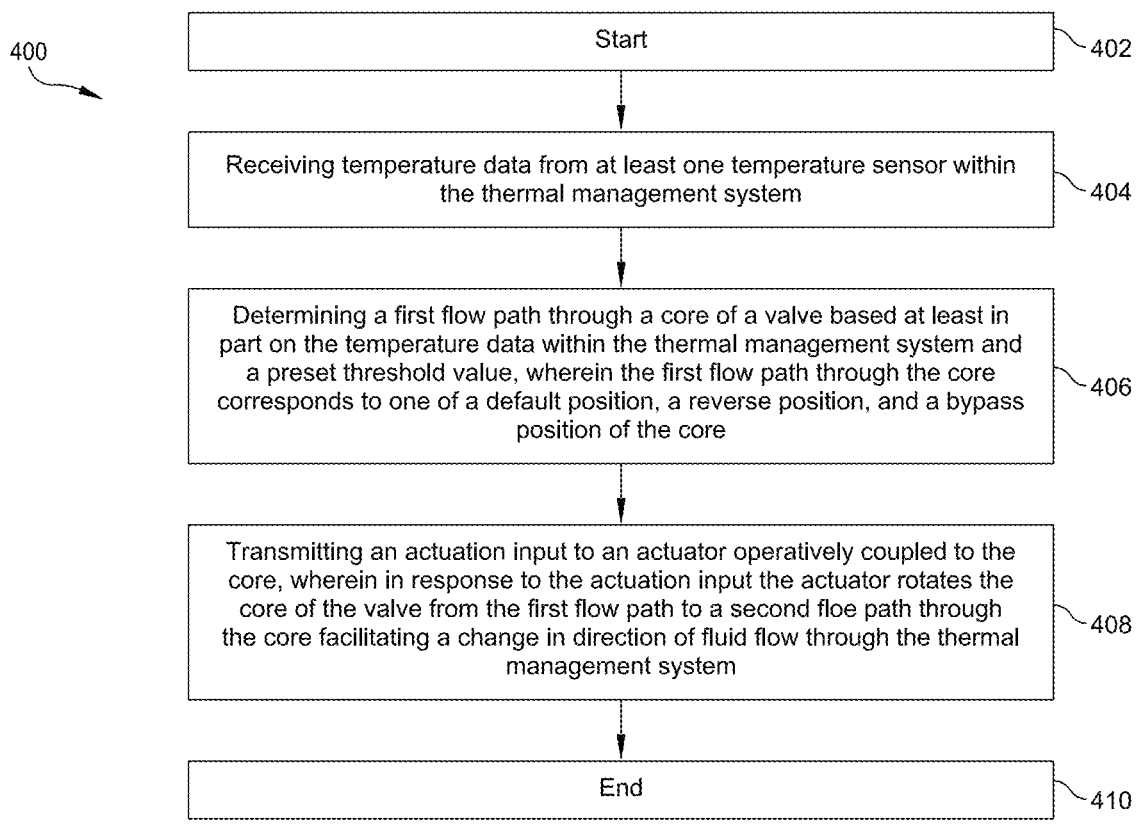
FIG. 13 illustrates a flow diagram of an example method for controlling flow with a bypass reverse valve in accordance with some embodiments.

FIG. 13 is a flow diagram of an example method for controlling flow with a bypass reverse valve 100 in accordance with some embodiments. The method starts at step 402 and moves to step 404, which includes receiving temperature data from at least one temperature sensor within the thermal management system 200. The method also includes step 406, which includes determining a first flow path through a core 136 of a valve 100 based at least in part on the temperature data within the thermal management system 200 and a preset threshold value. The first flow path through the core 136 may correspond to one of a default position, a reverse position, and a bypass position of the core 136. The method also includes step 408, which includes transmitting an actuation input to an actuator 176 operatively coupled to the core 136. In response to the actuation input the actuator 176 rotates the core 136 of the valve 100 from the first flow path to a second flow path through the core 136 facilitating a change in direction of fluid flow through the thermal management system 200. The method ends at step 410.

In some embodiments, a valve may include a core defining a first channel, a second channel, and a third channel disposed within the core. The core may be configured to rotate to at least a first position, a second position, and a third position. When the core is in the first position fluid flow may be facilitated in a first direction through the first channel and the third channel. When the core is in the second position fluid flow may be facilitated in a second direction through the third channel and the first channel. When the core is in the third position fluid flow may be facilitated in a third direction through the second channel. The valve may also include a housing having a top section and a bottom section of the housing. The housing may have a first input port, a first output port, a second input port, and a second output port positioned on the housing. The core may be disposed within the housing.

In some embodiments, the valve may include a cap operatively coupled to the top section of the housing. The cap may define a hole disposed through the cap. The valve may also include a shaft disposed within the hole of the cap and operatively coupled to the core and an actuator through a shaft adapter. The valve may also include a frame operatively coupled to the housing and an actuator configured to fix the actuator to the housing. In response to an actuation input, the actuator may be configured to rotate the core.

In some embodiments, the valve may include a failure mechanism operatively coupled to the shaft adapter and configured to rotate the core to the first position in response to a failure of the actuator.

In some embodiments, the actuator may be a servo motor.

In some embodiments, the core may include a groove disposed on a top portion of the core that is configured to receive a pin operatively coupled to a bottom portion of the cap. The pin may limit a rotation of the core within the housing.

In some embodiments, the core may have a first bearing disposed on a top portion of the core and a second bearing disposed on a bottom portion of the core. The first bearing and the second bearing may be configured to allow the core to rotate within the housing.

In some embodiments, the core may be made of a self-lubricating plastic configured to allow the core to rotate within the housing.

In some embodiments, with the core in the first position the first input port may be coupled to an output of a chiller and the first output port may be coupled to an input of at least one load facilitating fluid flow through the first channel, and the second input port may be coupled to an output of the at least one load and the second output port may be coupled to an input of the chiller facilitating fluid flow through the third channel.

In some embodiments, with core in the second position the first input port may be coupled to an output of a chiller and the second input port may be coupled to an output of at least one load facilitating fluid flow through the third channel, and the first output port may be coupled to an input of the at least one load and the second output port may be coupled to an input of the chiller facilitating fluid flow through the first channel.

In some embodiments, with the core in the third position the first input port may be coupled to an output of a chiller and the second output port may be coupled to an input of the chiller facilitating fluid flow through the second channel.

In some embodiments, a thermal management system includes a valve having a core defining a first channel, a second channel, and a third channel disposed within the core. The core may be configured to rotate to at least a first position, a second position, and a third position. When the core is in the first position fluid flow may be facilitated in a first direction through the first channel and the third channel. When the core is in a second position fluid flow may be facilitated in a second direction through the third channel and the first channel. When the core is in a third position fluid flow may be facilitated in a third direction through the second channel. The valve may also include a housing having a top section and a bottom section of the housing. The housing may have a first input port, a first output port, a second input port, and a second output port positioned on the housing. The core may be disposed within the housing. The thermal management system may also include at least one load coupled to the thermal management system that is cooled by the fluid. The thermal management system may also include a chiller configured to cool the fluid. The thermal management system may also include a computing device communicatively coupled to an actuator coupled to the core. The computing device may be configured to send an actuation input to the actuator to rotate the core to one of the first position, the second position, and the third position of the core.

In some embodiments, the valve includes a cap operatively coupled to the top section of the housing. The cap may define a hole through the cap. The valve may also include a shaft disposed within the hole of the cap and operatively coupled to the core and the actuator through a shaft adapter. The valve may also include a frame operatively coupled to the housing and the actuator configured to fix the actuator to the housing. In response to an actuation input, the actuator may be configured to rotate the core.

In some embodiments, the thermal management system includes a failure mechanism operatively coupled to the shaft adapter and may be configured to rotate the core to a default position in response to a failure of the actuator.

In some embodiments, the actuator may be a servo motor.

In some embodiments, the core may be made of a self-lubricating plastic configured to allow the core to rotate within the housing.

In some embodiments, the core may have a first bearing disposed on a top portion of the core and a second bearing disposed on a bottom portion of the core. The first bearing and the second bearing may be configured to allow the core to rotate within the housing.

In some embodiments, with the core in the first position the first input port may be coupled to an output of a chiller and the first output port may be coupled to an input of at least one load facilitating fluid flow through the first channel, and the second input port may be coupled to an output of the at least one load and the second output port may be coupled to an input of the chiller facilitating fluid flow through the third channel.

In some embodiments, with core in the second position the first input port may be coupled to an output of a chiller and the second input port may be coupled to an output of at least one load facilitating fluid flow through the third channel, and the first output port may be coupled to an input of the at least one load and the second output port may be coupled to an input of the chiller facilitating fluid flow through the first channel.

In some embodiments, with the core in the third position the first input port may be coupled to an output of a chiller and the second output port may be coupled to an input of the chiller facilitating fluid flow through the second channel.

In some embodiments, the computing device may determine a position of the core based at least in part on processing a plurality of temperatures from a plurality of temperature sensors within the thermal management system and a preset threshold value.

In some embodiments, a method of managing fluid flow through a thermal management system includes receiving temperature data from at least one temperature sensor within the thermal management system. The method may also include determining a first flow path through a core of a valve based at least in part on the temperature data within the thermal management system and a preset threshold value. The first flow path through the core may correspond to one of a default position, a reverse position, and a bypass position of the core. The method may also include transmitting an actuation input to an actuator operatively coupled to the core. In response to the actuation input the actuator may rotate the core of the valve from the first flow path to a second flow path through the core facilitating a change in direction of fluid flow through the thermal management system.

It may be emphasized that the above-described embodiments, particularly any "preferred" embodiments, are merely possible examples of implementations, set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

While this specification contains many specifics, these should not be construed as limitations on the scope of any disclosures, but rather as descriptions of features that may be specific to particular embodiment. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. A valve comprising:
   a core defining a first channel, a second channel, and a third channel disposed within the core, wherein the core is configured to rotate to at least a first position, a second position, and a third position, wherein when the core is in the first position fluid flow is facilitated in a first direction through the first channel and the third channel, when the core is in the second position fluid flow is facilitated in a second direction through the third channel and the first channel, and when the core is in the third position fluid flow is facilitated in a third direction through the second channel;
   a housing having a top section and a bottom section, wherein the housing has a first input port, a first output port, a second input port, and a second output port positioned on the housing, and wherein the core is disposed within the housing;
   a cap operatively coupled to the top section of the housing, wherein the cap defines a hole disposed through the cap;
   a shaft disposed within the hole of the cap and operatively coupled to the core and an actuator through a shaft adapter;
   a frame operatively coupled to the housing and the actuator configured to fix the actuator to the housing; and
   a torsional spring operatively coupled to the shaft adapter, wherein in response to an actuation input, the actuator is configured to rotate the core, and
   wherein the torsional spring is configured to rotate the core to the first position in response to a failure of the actuator.

2. The valve of claim 1, wherein the actuator is a servo motor.

3. The valve of claim 1, wherein the core further comprises a groove disposed on a top portion of the core that is configured to receive a pin operatively coupled to a bottom portion of the cap, and wherein the pin limits a rotation of the core within the housing.

4. The valve of claim 1, wherein the core has a first bearing disposed on a top portion of the core and a second bearing disposed on a bottom portion of the core, wherein the first bearing and the second bearing are configured to allow the core to rotate within the housing.

5. The valve of claim 1, wherein the core is made of a self-lubricating plastic configured to allow the core to rotate within the housing.

6. The valve of claim 1, wherein with the core in the first position the first input port is coupled to an output of a chiller and the first output port is coupled to an input of at least one load facilitating fluid flow through the first channel, and the second input port is coupled to an output of the at least one load and the second output port is coupled to an input of the chiller facilitating fluid flow through the third channel.

7. The valve of claim 1, wherein with core in the second position the first input port is coupled to an output of a chiller and the second input port is coupled to an output of at least one load facilitating fluid flow through the third channel, and the first output port is coupled to an input of the at least one load and the second output port is coupled to an input of the chiller facilitating fluid flow through the first channel.

8. The valve of claim 1, wherein with the core in the third position the first input port is coupled to an output of a chiller and the second output port is coupled to an input of the chiller facilitating fluid flow through the second channel.

9. A thermal management system comprising:
   a valve comprising:
     a core defining a first channel, a second channel, and a third channel disposed within the core, wherein the core is configured to rotate to at least a first position, a second position, and a third position, wherein when the core is in the first position fluid flow is facilitated in a first direction through the first channel and the third channel, when the core is in a second position fluid flow is facilitated in a second direction through the third channel and the first channel, and when the core is in a third position fluid flow is facilitated in a third direction through the second channel;
     a housing having a top section and a bottom section, wherein the housing has a first input port, a first output port, a second input port, and a second output port positioned on the housing, wherein the core is disposed within the housing;
     a cap operatively coupled to the top section of the housing, wherein the cap defines a hole through the cap;
     a shaft disposed within the hole of the cap and operatively coupled to the core and an actuator through a shaft adapter;
     a frame operatively coupled to the housing and the actuator configured to fix the actuator to the housing; and
     a torsional spring operatively coupled to the shaft adapter;
   at least one load coupled to the thermal management system that is cooled by the fluid;
   a chiller configured to cool the fluid; and
   a computing device communicatively coupled to the actuator, wherein the computing device comprises a processor and a memory, wherein the memory stores instructions, which when executed by the processor cause the computing device to:
     based at least in part on a temperature of a first load of the at least one load exceeding a sum of a temperature of a last load of the at least one load and a preset threshold value, and based at least in part on the temperature of the first load exceeding a sum of a temperature of the fluid at the first output port and the preset threshold value, align the core to the first position for fluid flow in the first direction;
     based at least in part on a temperature of the last load exceeding a sum of the preset threshold value and a temperature of the first load, and based at least in part on the temperature of the first load exceeding a sum of the temperature of the fluid at the first output port and the preset threshold value, align the core to the second position for fluid flow in the second direction; and based at least in part on a temperature of the fluid leaving the chiller exceeding a sum of a maximum temperature of a hottest load of the at least one load and the preset threshold value, align the core to the third position for fluid flow in the third direction, wherein the torsional spring is configured to rotate the core to the first position in response to a failure of the actuator.

10. The thermal management system of claim 9, wherein the actuator is a servo motor.

11. The thermal management system of claim 9, wherein the core is made of a self-lubricating plastic configured to allow the core to rotate within the housing.

12. The thermal management system of claim 9, wherein the core has a first bearing disposed on a top portion of the core and a second bearing disposed on a bottom portion of the core, and wherein the first bearing and the second bearing are configured to allow the core to rotate within the housing.

13. The thermal management system of claim 9, wherein with the core in the first position the first input port is coupled to an output of a chiller and the first output port is coupled to an input of at least one load facilitating fluid flow through the first channel, and the second input port is coupled to an output of the at least one load and the second output port is coupled to an input of the chiller facilitating fluid flow through the third channel.

14. The thermal management system of claim 9, wherein with the core in the second position the first input port is coupled to an output of a chiller and the second input port is coupled to an output of at least one load facilitating fluid flow through the third channel, and the first output port is coupled to an input of the at least one load and the second output port is coupled to an input of the chiller facilitating fluid flow through the first channel.

15. The thermal management system of claim 9, wherein with the core in the third position the first input port is coupled to an output of a chiller and the second output port is coupled to an input of the chiller facilitating fluid flow through the second channel.

16. The thermal management system of claim 9, wherein the preset threshold value is between 0.5 and 10 degrees celsius.

17. The thermal management system of claim 9, wherein the computing device determines a position of the core on a predetermined cycle.

18. The thermal management system of claim 17, wherein the predetermined cycle is 15 seconds.

19. A method of managing fluid flow comprising:

receiving temperature data from at least one temperature sensor within a thermal management system;

based at least in part on a temperature of a first load of the thermal management system exceeding a sum of a temperature of a last load of the thermal management system and a preset threshold value, and based at least in part on the temperature of the first load exceeding the sum of a temperature of a fluid at a first output port of a valve and the preset threshold value, aligning a core of the valve to a first position for fluid flow in a first direction;

based at least in part on the temperature of the last load exceeding a sum of the preset threshold value and the temperature of a first load, and based at least in part on the temperature of the first load exceeding a sum of the temperature of the fluid at the first output port and the preset threshold value, aligning the core to a second position for fluid flow in a second direction; and based at least in part on a temperature of the fluid leaving a chiller exceeding a sum of a maximum temperature of a hottest load of the thermal management system and the preset threshold value, aligning the core to a third position for fluid flow in a third direction.

20. The method of managing fluid flow of claim 19, wherein the first position of the core corresponds to a default position, the second position of the core corresponds to a reverse position, and the third position of the core corresponds to a bypass position of the core.

* * * * *